UNITED STATES PATENT OFFICE 2,212,767

AMIDE DERIVATIVES OF 3,5-DIMETHYL-ISOXAZOLE CARBOXYLIC ACIDS

André Blankart, Basel, Switzerland, assignor to Hoffmann-La Roche Inc., Nutley, N. J., a corporation of New Jersey No Drawing. Application January 4, 1939, Serial No. 249,341. In Germany January 17, 1938

4 Claims. (Cl. 260—294)

In accordance with Patents 2,115,681 and 2,126,329 dialkyl or aryl-alkyl substituted amides of isoxazole carboxylic acids possessing valuable therapeutic properties are obtained by transformation of compounds of the general formula

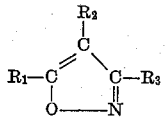

in which one of the radicals $R_1$, $R_2$, $R_3$ represents a carboxyl group, the others alkyl radicals or hydrogen, into reactive acid derivatives, for instance acid chlorides, and subsequent reaction of these derivatives with secondary amines.

It has now been found that dialkyl and aryl alkyl amides of acids, the carboxyl group of which is separated by one or more methylene groups from the isoxazole nucleus, also possess a remarkable analeptic action. Such action is considerably stronger than that of the compounds obtained according to Patent 2,115,681. Thus, for instance, the diethylamide of 3,5-dimethyl-isoxazole-4-acetic acid exerts an action on the respiration of the morphinised rabbit already in doses of 0.5 milligramme per kilogramme, whereas the toxic dose for mice only amounts to 50 milligrammes per kilogramme.

The compounds in accordance with the present invention are of the following general formula:

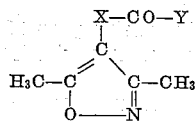

wherein X comprises a lower saturated alkylene radical and Y a radical selected from the group consisting of

wherein R' and R are each selected from the group of lower saturated alkyl radicals and aryl radicals of the benzene group, and —N=R'' wherein R'' represents an alkylene radical forming a heterocyclic ring with the nitrogen.

The following table, in which d. l.=lethal dose for mice in milligrammes per kilogramme on intraveneous administration, r. s.=the lowest dose causing stimulation of respiration for morphinised rabbits, also on intraveneous administration in milligrammes per kilogramme, shows that the respiratory stimulating action of the new compounds is also greater than that of the compounds obtained in accordance with Patent 2,126,329.

| Derivative of— | 3,5-dimethyl-isoxazole-4-carboxylic acid | | 3,5-dimethyl-isoxazole-4-acetic acid | | 3,5-dimethyl-isoxazole-4-propionic acid | |
|---|---|---|---|---|---|---|
| | d. l. | r. s. | d. l. | r. s. | d. l. | r. s. |
| Diethyl amide | 150 | 5 | 50 | 0.5 | 300 | 2 |
| Piperidide | 200 | 10 | 150 | 7 | 250 | 3 |
| Methyl anilide | 30 | 1.5 | 4 | 0.1 | | |

In order to prepare the new compounds, reactive derivatives of the homologues of isoxazole carboxylic acids, such as acid chlorides, bromides, anhydrides, are caused to react with the corresponding secondary amines.

The new compounds are to be used as medicines.

Example 1

17.3 parts by weight of 3,5-dimethylisoxazole-4-acetic acid chloride are added to 40 parts by weight of benzene, 7.8 parts by weight of diethylamine and 20 parts by weight of a 20% solution of caustic soda in the course of a few hours while stirring and keeping the temperature below +10° C. by cooling with a freezing mixture. When all has reacted, a further 20 parts by weight of a concentrated solution of caustic soda is added, the benzene solution separated and dried with 1 part by weight of potassium carbonate, filtered and evaporated. The residue of the formula

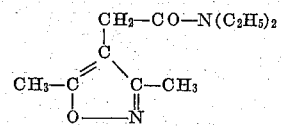

is distilled at reduced pressure; a colourless oil distils at 180° C. at a pressure of 12 mm. and solidifies after a while. Melting point 59° C.

Example 2

17.3 parts by weight of 3,5-dimethylisoxazole-4-acetic acid chloride are added to an ethereal solution of 90 parts by weight of dimethylamine. When no further precipitation occurs, the product is shaken with 15 c. c. of a concentrated solution of caustic soda, the ether layer removed and dried with solid potassium hydroxide. After evaporation of the ether, the 3,5-dimethyl-isoxazole-4-acetic-acid-dimethyl amide of the formula

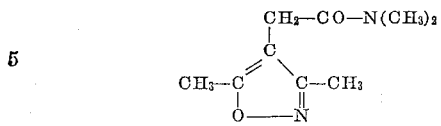

remains as a solid compound.

It is recrystallised from ether or acetic acid by addition of a little petroleum ether. It then melts at 70° C.

*Example 3*

A solution of 17.3 parts by weight of 3,5-dimethyl-isoxazole-4-acetic acid chloride in little benzene are added to a solution of 17 parts by weight of piperidine in 100 parts by weight of benzene while cooling. The piperidine hydrochloride precipitates. The product is filtered and the benzene solution purified by shaking with a concentrated solution of caustic soda. The product is then nearly completely evaporated and petroleum ether carefully added to the cold solution. The 3,5-dimethyl-isoxazole-4-acetic acid piperidide of the formula

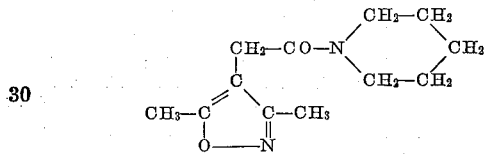

precipitates in white needles melting at 82° C.

*Example 4*

18.3 parts by weight of 3,5-dimethyl-isoxazole-4-acetic-acid-ethyl ester are heated to 160° C. with 10.7 parts by weight of methyl aniline for 8 hours in an atmosphere of nitrogen. The reaction product is shaken with acid and ether, the ethereal solution washed with a little water, dried with calcium chloride and evaporated. The residue is distilled under reduced pressure. A clear viscous oil is obtained at 190° C. at a pressure of 13 mm. It is dissolved in little absolute ether and carefully precipitated with petroleum ether, the solid prisms melting at 63–65° C. are recrystallised. Its formula is

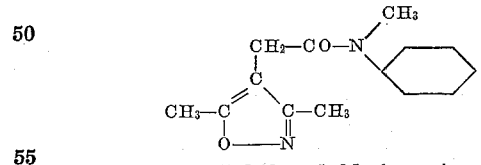

They are only slightly soluble in water, but easily soluble in alcohol, benzene and ether.

*Example 5*

18.7 parts by weight of 3,5-dimethyl-isoxazole-4-propionic acid chloride are added to a benzene solution of 15.6 parts by weight of diethylamine and the temperature kept at 50° C. for 2 hours. The diethylamine hydrochloride formed is sucked off and the benzene solution shaken once with a concentrated solution of calcium chloride. The benzene solution is evaporated and the residue distilled in vacuo. The 3,5-dimethyl-isoxazole-4-propionic-acid-diethyl amide having the formula

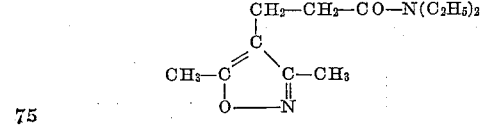

is obtained as a yellow, viscous oil; boiling point 140–145° C./0.3 mm. It solidifies on standing and then melts at 48–50° C.

*Example 6*

11.4 parts by weight of 3,5-dimethyl-isoxazole-4-acetic acid are treated with 33 parts by weight of thionyl chloride and kept at 40° C. for 4 hours. The surplus thionyl chloride is distilled in vacuo and the last traces removed by adding and distilling off toluene. The remaining acid chloride is taken up in 50 parts by weight of benzene and added to a solution of 14.5 parts by weight of methyl aniline in 50 parts by weight of benzene. The temperature is kept for another half-hour at 60° C. Thereby a thick precipitate of methyl-aniline hydrochloride is formed. It is sucked off. The filtrate is twice washed with a saturated solution of sodium chloride and the solvent evaporated. The residue is taken up in little absolute ether, petroleum ether added as long as it is not rendered turbid. On seeding well developed crystals precipitate. They are again recrystallised from little absolute ether. Fine colourless prisms, having the formula

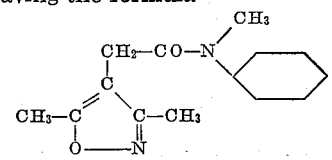

melting at 63–65° C. are obtained.

*Example 7*

183 parts by weight of 3,5-dimethyl-isoxazole-4-propionic-acid-methyl ester are mixed with 170 parts by weight of piperidine and heated for 14 hours in a boiling water bath. The cooled solution is poured into about 470 parts by volume of 3-n hydrochloric acid. After a short time the oil solidifies to a crystalline mass. The precipitate is sucked off and recrystallised from ethyl acetate. The 3,5-dimethyl-isoxazole-4-propionic acid piperidide of the formula

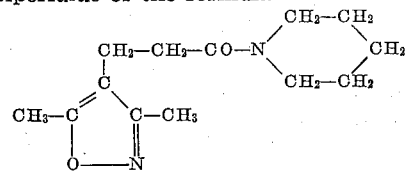

forms fine needles melting at 111° C. It is not readily soluble in water and ether, easily soluble in alcohol.

*Example 8*

183 parts by weight of dimethyl-isoxazole-propionic-acid-methyl ester are mixed in an autoclave with 55 parts by weight of diethylamine and the temperature kept at 100° C. for 24 hours. The excess of diethylamine is distilled from the clear solution. The residue is taken up in butyl ether, washed with dilute acid and concentrated. On seeding the 3,5-dimethyl-isoxazole-4-propionic-acid-diethylamide of the formula

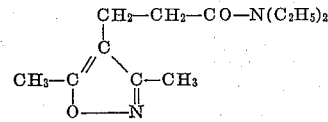

crystallises.

*Example 9*

20 parts by weight of β-(3,5-dimethyl-isoxazole)-butyric acid methyl ester are boiled with 30 parts by weight of piperidine for 18 hours on reflux. The methyl alcohol and the surplus piperidine are, if possible, completely distilled off and the residue distilled in vacuo. At a pressure of 12 mm. of mercury a yellow oil passes over at 210–215° C. The β-dimethyl-isoxazole-butyric-acid piperidide of the formula

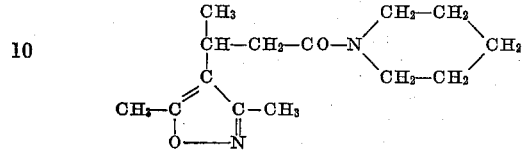

is only slightly soluble in water, petroleum ether and ether, but easily soluble in alcohol.

In the claims the term "aryl hydrocarbon radicals of the benzene series" is intended to mean benzene and its homologues.

I claim:

1. As a medicinal remedy, a compound of the general formula

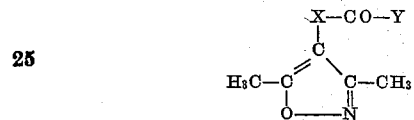

wherein X is a lower saturated alkylene hydrocarbon radical and Y is a radical selected from the group consisting of

wherein R' and R are each selected from the group consisting of unsubstituted lower saturated alkyl radicals and aryl hydrocarbon radicals of the benzene series, and —N=R'' wherein R'' represents an alkylene hydrocarbon radical forming a piperidino ring with the nitrogen, which compound acts as a circulatory stimulant.

2. As a medicinal remedy for use as a circulatory stimulant 3,5-dimethyl-isoxazole-4-acetic-acid-diethylamide.

3. As a medicinal remedy for use as a circulatory stimulant 3,5-dimethyl-isoxazole-4-acetic-acid-methyl-anilide.

4. As a medicinal remedy for use as a circulatory stimulant β-(3,5-dimethyl-isoxazole-4)-butyric-acid-piperidide.

ANDRÉ BLANKART.